United States Patent [19]

Rosenson

[11] Patent Number: 4,958,923
[45] Date of Patent: Sep. 25, 1990

[54] APPARATUS FOR DECORATING AN EYEGLASS FRAME

[76] Inventor: Andrew S. Rosenson, 3705 W. Greenwood, Skokie, Ill. 60076

[21] Appl. No.: 315,150

[22] Filed: Feb. 24, 1989

[51] Int. Cl.$^5$ .................. G02C 11/02; G02C 7/08; G02C 1/04
[52] U.S. Cl. .................. 351/52; 351/51; 351/57; 351/106
[58] Field of Search .................. 351/51, 52, 41, 106, 351/57, 58

[56] References Cited

U.S. PATENT DOCUMENTS

| | | |
|---|---|---|
| 2,835,063 | 5/1958 | Worthington . |
| 3,021,753 | 2/1962 | Vinson . |
| 3,526,450 | 9/1970 | Berry . |
| 3,542,460 | 11/1970 | Smith . |
| 4,045,131 | 8/1977 | Sherman . |

FOREIGN PATENT DOCUMENTS

| | | | |
|---|---|---|---|
| 1281916 | 12/1961 | France | 351/52 |
| 634250 | 2/1962 | Italy | 351/52 |
| 2184862 | 7/1987 | United Kingdom | 351/52 |

Primary Examiner—Rodney B. Bovernick

[57] ABSTRACT

An apparatus for decorating an eyeglass frame, which eyeglass frame has a thickness and defines an expanse. The apparatus comprises a decorating member having integral engagement structure for removably affixing the decorating member to the eyeglass frame. The engagement structure comprises at least a first engagement structure and a second engagement structure which cooperate to engage the eyeglass frame across the expanse to removably affix the decorating member to the eyeglass frame member.

14 Claims, 4 Drawing Sheets

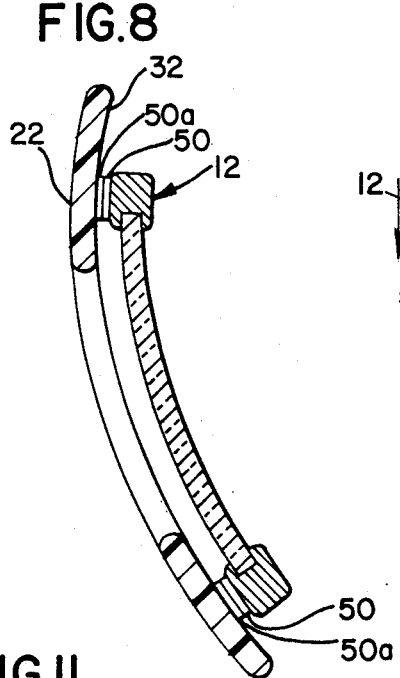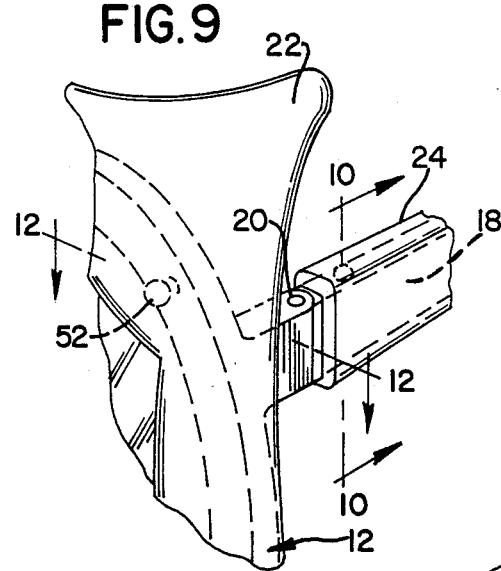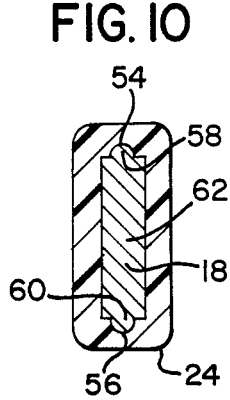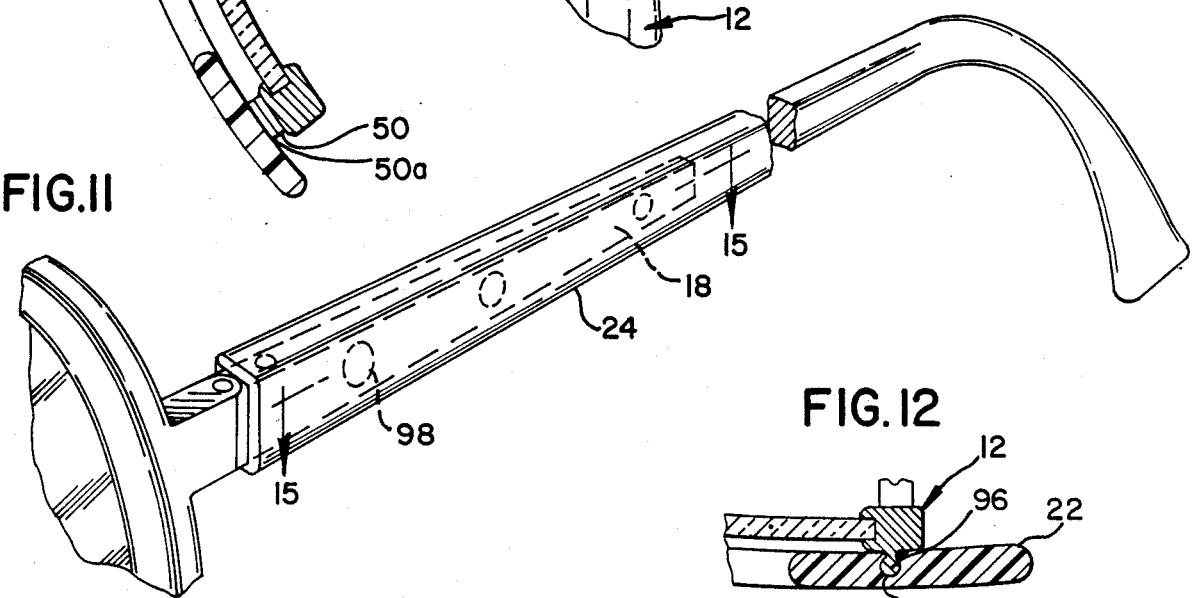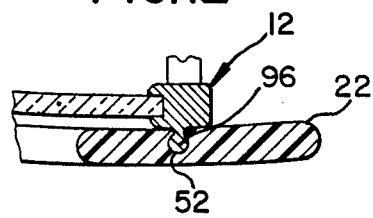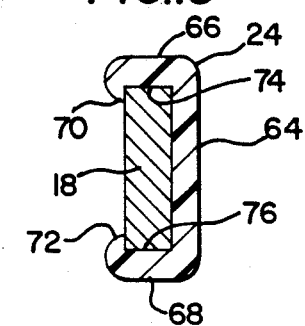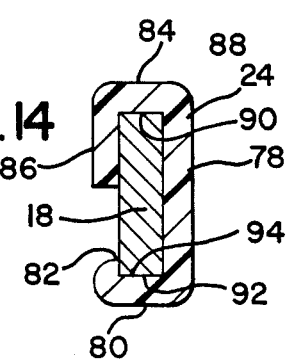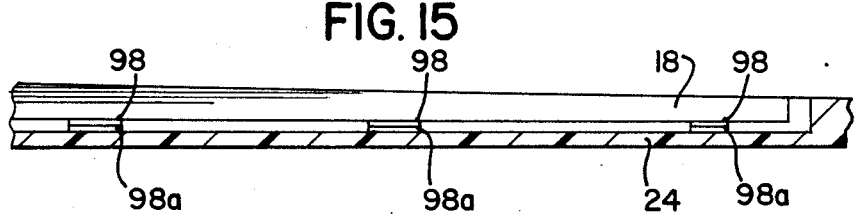

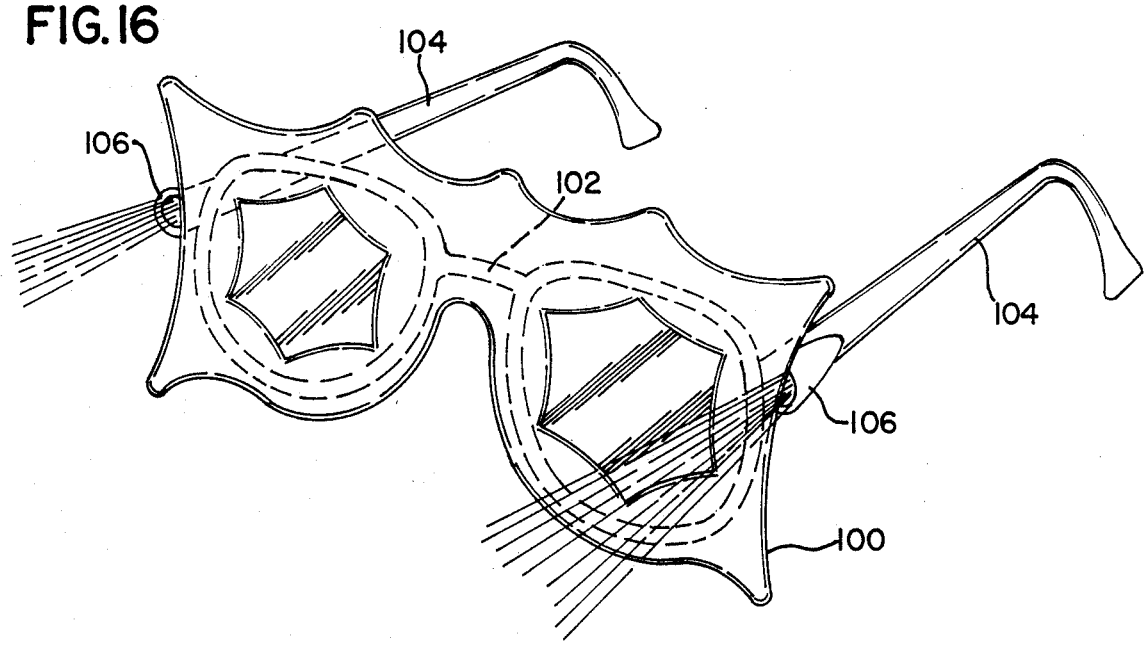
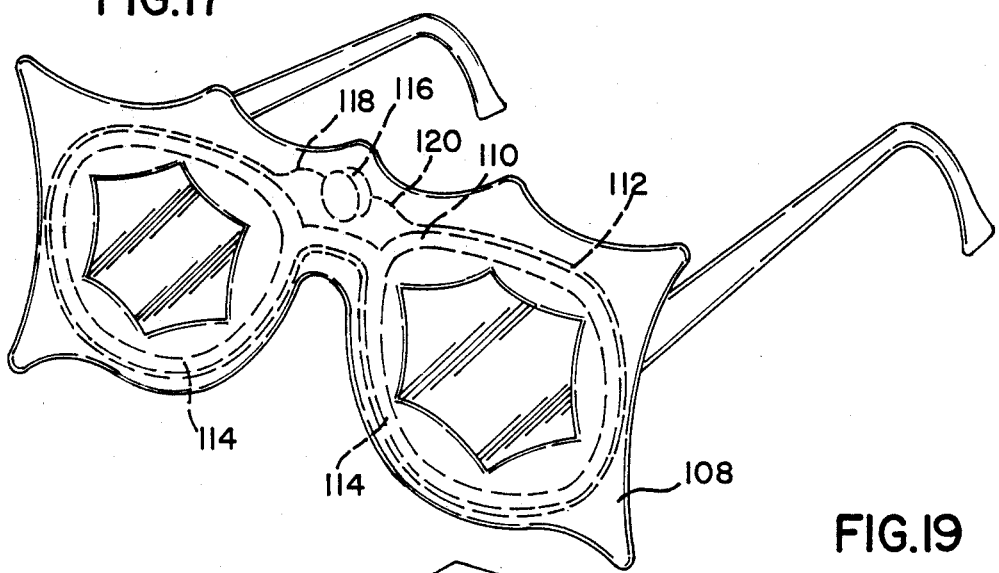
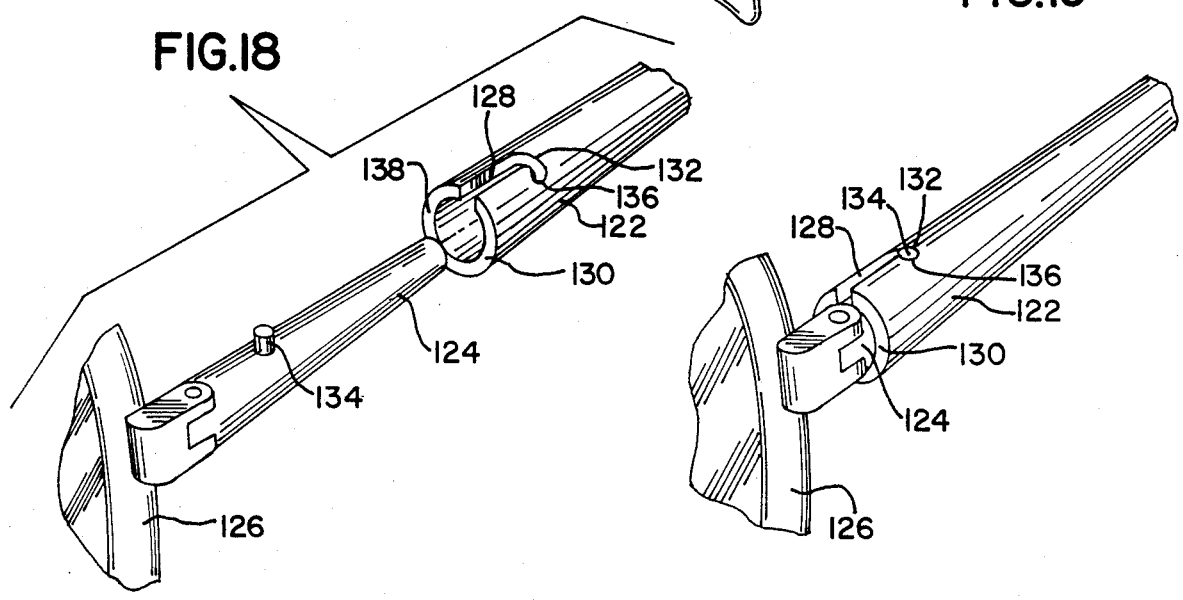

APPARATUS FOR DECORATING AN EYEGLASS FRAME

BACKGROUND OF THE INVENTION

The present invention is directed to an apparatus for decorating an eyeglass frame, which apparatus is removably attachable to an eyeglass frame to effect alterations of appearance of the eyeglass frame.

Of particular significance in the present invention is the means for attachment of the decorating frame to the eyeglass frame, which means provides secure fastening of the decorating frame to the eyeglass frame while still providing that such fastening is removable.

Other designs and apparatus for provision of removable decorative elements to eyeglasses have been disclosed.

For example, U.S. Pat. No. 2,835,063 to R.R. Worthington discloses an ornamental cover for spectacle frames using spring clips to hold the ornamental cover on the frame.

U.S. Pat. No. 3,021,753 to R.C. Vinson discloses an ornamental frame for eyeglasses with a metal clip and receptacle attachment arrangement between the ornamental frame and the eyeglasses.

U.S. Pat. No. 3,526,450 to M.P. Berry discloses yet another ornamental covering for eyeglasses which is attached to the eyeglasses by elastically embracing the eyeglass frame.

U.S. Pat. No. 3,542,460 to R.L. Smith discloses an eyeglass frame which is multi-pieced and changeable by a user. The Smith device provides an eyeglass frame which is itself decorative rather than a decorative frame attachable to a base frame.

U.S. Pat. No. 4,045,131 to J. Sherman discloses a decorative frame attachable to a base eyeglass frame with a pop-fitting integrally formed of the plastic material of the decorative frame and insertable in mating receptacles formed in the eyeglass frame. The decorative frame of Sherman is formable in the shape of letters, words, animals, or the like.

None of the foregoing disclosures reveal the sturdy yet removable attachment means of the present invention.

SUMMARY OF THE INVENTION

The invention is an apparatus for decorating an eyeglass frame and comprises a decorating frame having an integral engagement structure for removably affixing the decorating frame to the eyeglass frame. The engagement structure comprises, in the preferred embodiment, a first engagement member and a second engagement member which are situated substantially at opposite points across the eyeglass frame and cooperate to snappingly engage the eyeglass frame to provide removable affixation of the decorating frame to the eyeglass frame. The affixation of the decorating frame to the eyeglass frame is substantially sturdy, especially in comparison to the previously disclosed attachment means for affixing decorating frames to eyeglass frames.

It is therefore an object of this invention to provide an apparatus for decorating an eyeglass frame providing a sturdy, removably engaging affixation of a decorating frame to an eyeglass frame.

A further object of this invention is to provide an apparatus for decorating an eyeglass frame wherein affixation of the decorating frame to the eyeglass frame is accomplished by snappingly engaging the eyeglass frame with the engaging structure of the decorating frame.

Further objects and features of the present invention will be apparent from the following specification and claims when considered in connection with the accompanying drawings illustrating the preferred embodiments of the invention.

DETAILED DESCRIPTION OF THE DRAWINGS

FIG. 8 is a section view of the alternate embodiment of FIG. 7 taken along plane 8—8 of FIG. 7.

FIG. 9 is a detailed perspective view of still another alternate embodiment of the present invention illustrating yet another engagement system for attaching the decorating frame to the eyeglass frame.

FIG. 10 is a section view taken along plane 10—10 of FIG. 9.

FIG. 11 is a detailed perspective view of an embodiment of the present invention, similar to the alternate embodiment of FIG. 7, employed for attachment of temple pieces to the temple stubs of the eyeglass frame.

FIG. 12 is a section view taken along plane 12—12 of FIG. 9.

FIG. 13 is a section view of an embodiment of the present invention, similar to the embodiment of FIG. 3, employed for attachment of the temple pieces to the temple stubs of the eyeglass frame.

FIG. 14 is a section view of an engagement system, similar to the embodiment of FIG. 6, for attaching temple pieces to the temple stubs of the eyeglass frame.

FIG. 15 is a section view taken along plane 15—15 of FIG. 11.

FIG. 16 is a perspective view of an alternate embodiment of the present invention which includes a light source in the temple pieces.

FIG. 17 is a perspective view of yet another alternate embodiment of the present invention which includes a sinuous lighting element incorporated in the decorating frame.

3

FIG. 18 is a partial perspective exploded view of an alternate embodiment of a temple piece, illustrating details of the engagement structure associated with the temple piece and temple stub.

FIG. 19 is a partial perspective view of the alternate embodiment of the temple piece illustrated in FIG. 18, in assembled relation with its associated temple stub.

DETAILED DESCRIPTION OF THE INVENTION

Figure 1:
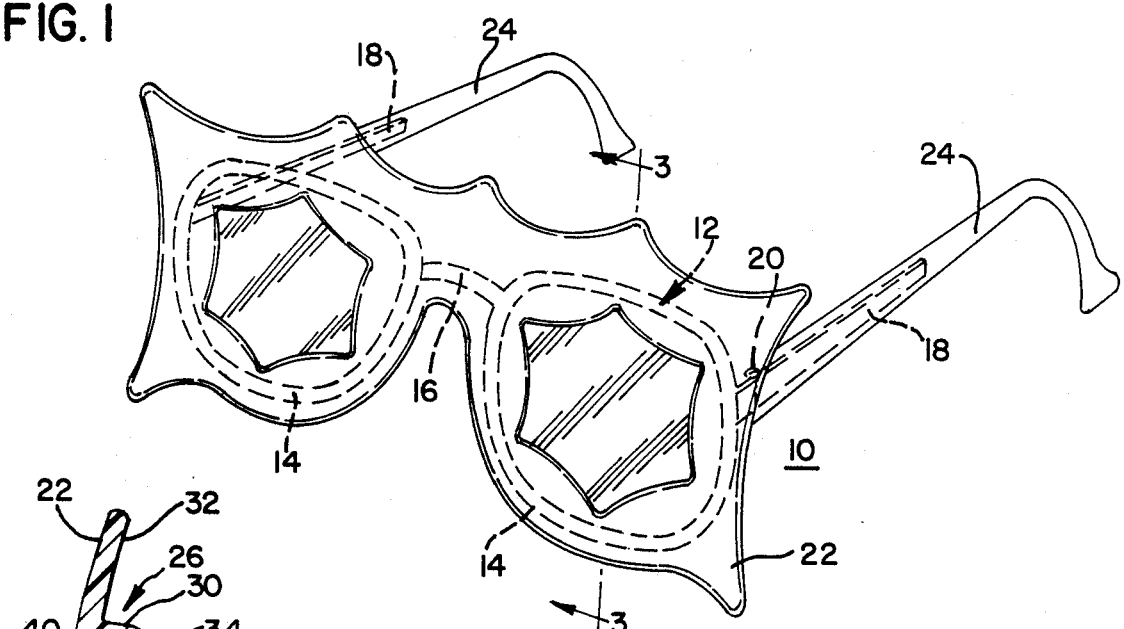
FIG. 1 is a perspective view of the preferred embodiment of the invention with the decorating frame affixed to the eyeglass frame.

The preferred embodiment of an apparatus 10 for decorating an eyeglass frame 12 is illustrated in FIG. 1. The eyeglass frame 12 is comprised of a pair of lens receiving members 14 joined by a bridge member 16. The lens receiving members 14 and the bridge member 16 may be integrally formed. Depending from one outboard side of each of the lens receiving members 14 is a temple member 18. Each respective temple member 18 may be joined with its corresponding lens receiving member 14 by a hinge 20, or each temple member 18 may be integrally formed with its respective lens receiving member 14.

Further illustrated in FIG. 1 is a decorative frame member 22 which is removably attached to the eyeglass frame 12 in a manner which shall be discussed hereinafter in greater detail. Still further illustrated in FIG. 1 are temple decorating members 24 which, in the preferred embodiment illustrated in FIG. 1, are removably attached to their respective temple members 18, also in a manner to be discussed in greater detail hereinafter.

Figure 2:
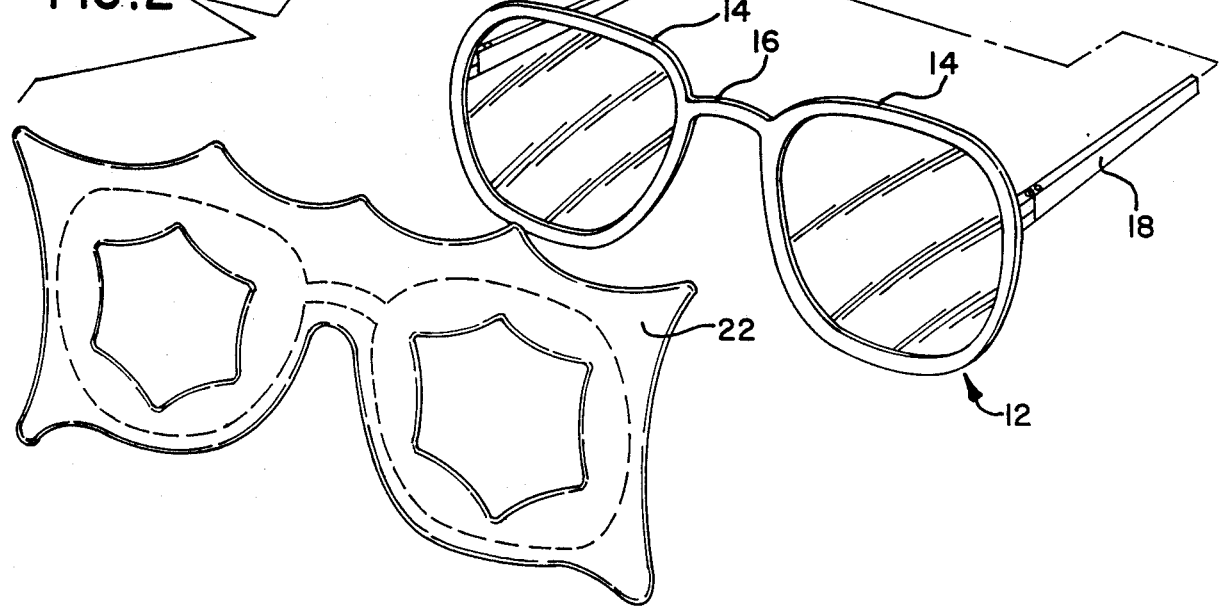
FIG. 2 is an exploded perspective view of the principal elements of the preferred embodiment illustrated in FIG. 1.

Referring to FIG. 2, the elements hereinbefore described with respect to FIG. 1 are shown in an exploded perspective view. Thus, in FIG. 2, the eyeglass frame member 12 is illustrated as comprising a pair of lens receiving members 14 joined by a bridge member 16 and having respectively depending therefrom each of a pair of temple members 18. The temple decorating members 24 are clearly illustrated in FIG. 2 as separate members attachable to the temple members 18. Moreover, the decorating frame member 22 is clearly illustrated in FIG. 2 as a separate member attachable to the eyeglass frame 12.

Figure 3:
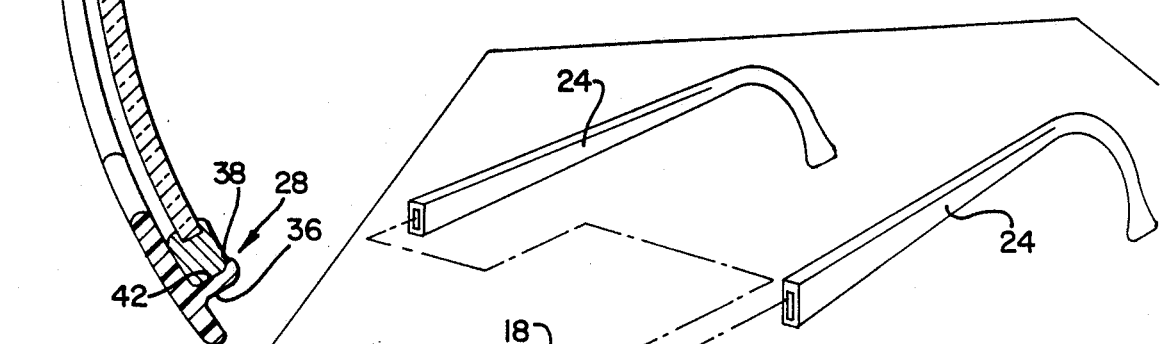
FIG. 3 is a section view taken along plane 3—3 of FIG. 1.

Referring to FIG. 3, a section view along plane 3—3 in FIG. 1 is illustrated to show in greater detail the structure which enables secure, yet removable attachment of the decorating frame member 22 to the eyeglass frame 12. In FIG. 3, the decorating frame member 22 is illustrated as having integrally formed therein a first engagement structure 26 and a second engagement structure 28. The first engagement structure 26 comprises an integrally formed leg 30 depending from a first face 32 of the decorative frame member 22. The free end of the leg 30 is configured to present a lip 34. The second engagement structure 28 is similarly comprised of an integrally formed leg 36 depending from the first face 32 of the decorative frame member 22 and configured at its distal end to present a lip 38.

The interval presented between the lips 34 and 38 is slightly less than the transverse dimension of the eyeglass frame 12 which is to be engaged by the decorative frame member 22. The respective legs 30 and 36 are configured to flex when the decorative frame member 22 is urged against the eyeglass frame 12 to allow the respective lips 34 and 38 to separate slightly, thereby allowing the eyeglass frame 12 to be snappingly, nestingly engaged between the legs 30 and 36.

As may be clearly seen in FIG. 3, the leg 30 and the lip 34 cooperate to present a channel 40 within which the eyeglass frame is nestingly engaged when the decorative frame member 22 is installed upon the eyeglass frame 12. Similarly, the leg 36 and lip 38 cooperate to present a channel 42 within which the eyeglass frame 12 also nestingly is engaged when the decorative frame member 22 is installed on the eyeglass frame 12.

Figure 4:
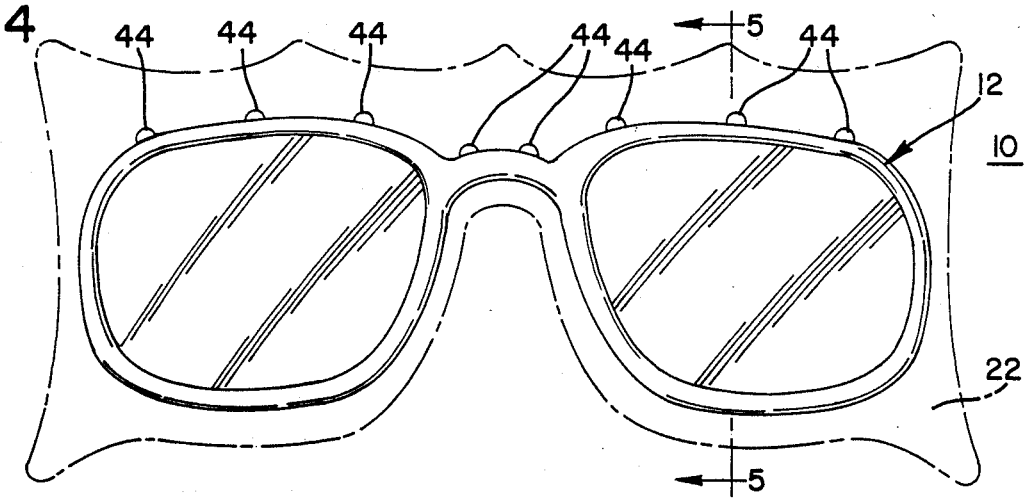
FIG. 4 is a front plan view of an alternate embodiment of the present invention illustrating a plurality of protuberances integrally formed in the eyeglass frame for interaction with the engagement structure of the decorating frame, with the decorating frame shown in phantom.

Referring to FIG. 4, a front plan view of an alternate embodiment of the apparatus for decorating an eyeglass frame 10 is illustrated. In the embodiment illustrated in FIG. 4, there are integrally formed on the eyeglass frame 12 a plurality of protuberances 4 which interact with the decorative frame 22 when the decorative frame 22 is installed on the eyeglass frame 12 to provide a firmer affixation, still removable, than is possible with the embodiment illustrated in FIGS. 1 through 3.

Figure 5:
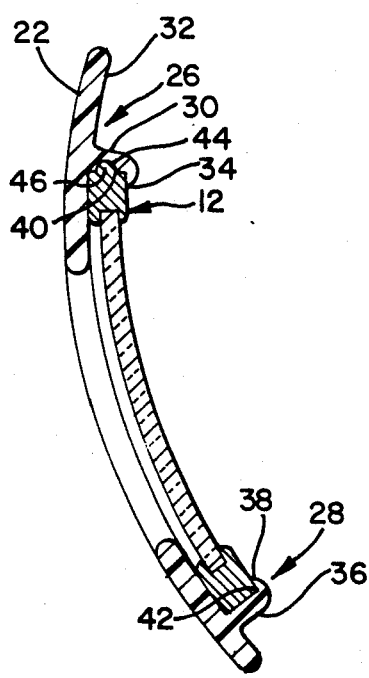
FIG. 5 is a section view taken along plane 5—5 of FIG. 4.

FIG. 5 illustrates the engagement structure of FIG. 4 in greater detail. Referring to FIG. 5, the decorative frame 22 is installed on the eyeglass frame 12. There are provided, depending from the first face 32 of the decorative frame 22, a flexible leg 30 with its distal end forming a lip 34 and a flexible leg 36 with its distal end forming a lip 38 similar to the structure previously described in connection with FIGS. 1–3. In addition, within the channel 40, defined by the leg 30 and its lip 34, is a receptacle 46 which is dimensioned to receive a respective protuberance 44 Each of the protuberances 44 on the eyeglass frame 12 is provided with a mating receptacle 46 on the decorative frame 22. Strong affixation of the decorative frame 22 to the eyeglass frame 12 is effected with the structure illustrated in FIGS. 4 and 5. Removable nesting engagement of the eyeglass frame 12 within the channel 40 and the channel 42 may be effected by pressing the decorative frame 22 against the eyeglass frame 12, thereby flexing the legs 30 and 36 to admit the eyeglass frame 12 within the channels 40 and 42, in a manner similar to that previously described in connection with FIGS. 1–3.

Figure 6:
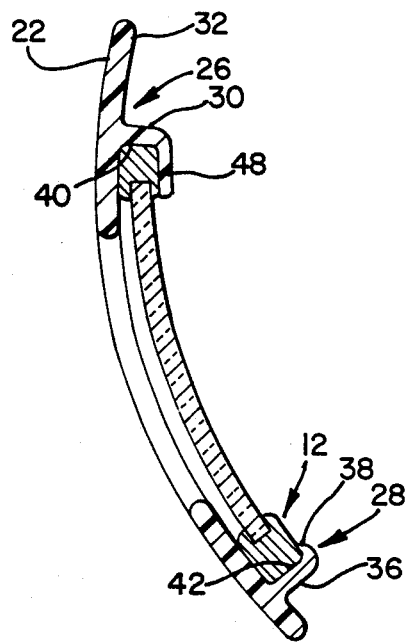
FIG. 6 is a section view of another alternate embodiment of the present invention similar to the view in FIG. 5, illustrating an alternate embodiment of the engagement structure associated with the decorating frame.

FIG. 6 illustrates another embodiment of the engagement structure which may be associated with the decorative frame 22. In FIG. 6, the decorative frame 22 has depending from its first side 32 a leg 36 with a lip 38 integrally formed in its distal end, similar to the structure previously described in connection with FIG. 3. In FIG. 6, however, the first engagement structure 26 is slightly different in that it comprises a leg 30 depending from the first face 32 of the decorative frame 22, but integrally formed with the distal end of the leg 30 is a tab 48. The tab 48 has a greater dimension substantially parallel to the first face 32 of the decorative frame 22 than does the lip 38.

In the embodiment illustrated in FIG. 6, installation of the decorative frame 22 on the eyeglass frame 12 is effected somewhat differently. Installation is accomplished by first slipping the eyeglass frame 12 within the channel 40 defined by the leg 30 and the tab 38, and then rotatingly urging the eyeglass frame 12 to engage the lip 38. Upon further such urging together of the decorative frame 22 and the eyeglass frame 12, the leg 36 will flex to allow the eyeglass frame 12 to pass the tab 38 to effect removable, nesting engagement of the eyeglass frame 12 within the channels 40 and 42.

Figure 7:
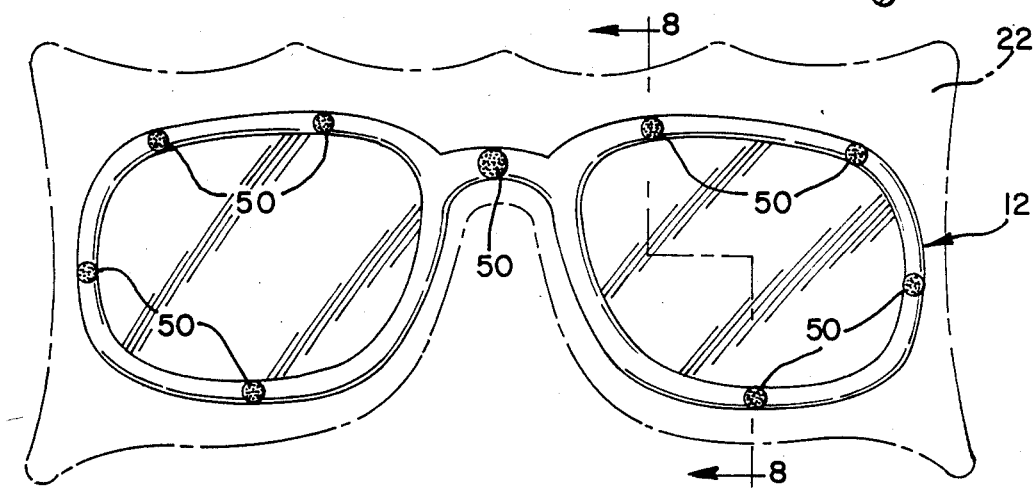
FIG. 7 is a front plan view of yet another alternate embodiment of the present invention, illustrating the employment of cooperating hook-and-eye attachment lands for affixation of the decorating frame to the eyeglass frame, with the decorating frame shown in phantom.

FIG. 7 illustrates yet another embodiment of the invention wherein cooperating hook-and-eye fasteners are employed to removably affix the decorative frame 22 to the eyeglass frame 12. In FIG. 7, the eyeglass frame 12 is illustrated as having applied thereto a plurality of lands 50 which cooperate with complimentary lands situated on the decorative frame 22 (not shown in FIG. 7) to effect a cooperative hook-and-eye affixation of the decorative frame 22 to the eyeglass frame 12, as will be described hereinafter in greater detail.

Referring to FIG. 8, the decorative frame 22 is illustrated in an installed position with respect to the eyeglass frame 12 utilizing the cooperative hook-and-eye fasteners as described in connection with FIG. 7. In FIG. 8, the eyeglass frame 12 has affixed thereto a plurality of lands 50 facing the first face 32 of the decorative frame 22. Affixed to the first face 32 of the decorative frame 22 are a plurality of complimentary lands 50a. When the decorative frame 22 is aligned for proper affixation to the eyeglass frame 12, the lands 50 and corresponding lands 50a are substantially in register so that simply urging the decorative frame 22 toward the eyeglass frame 12 results in interaction of the cooperative hook-and-eye fasteners incorporated in the respective pairs of lands 50 and complimentary lands 50a to effect a removable affixation of the decorative frame 22 to the eyeglass frame 12.

FIG. 9 illustrates a partial perspective view of details of another embodiment of the decorative frame 22 installed on the eyeglass frame 12, as well as a temple member 24 installed on a temple stub 18. It should be noted that when there is a hinge 20 connecting the temple stub 18 with the eyeglass frame 12, the temple decorating member 24, in its installed position as illustrated in FIG. 9, does not interfere with the hinge 20. In FIG. 9, the affixation of the decorating frame 22 to the eyeglass frame 12 is effected through interaction of a receptacle in the decorating frame 22 (not shown in FIG. 9) with an integrally formed plastic boss member 52 on the eyeglass frame 12. The engagement of decorating frame member 22 with eyeglass frame 12 will be described hereinafter in greater detail in connection with FIG. 12.

Referring to FIG. 10, a section view along plane 10—10 of FIG. 9 is illustrated showing the interaction of the temple stub 18 with the temple decorating member 24. The temple member 18 is provided with an upper ridge 54 and a lower ridge 56, which cooperate respectively with an upper groove 58 and a lower groove 60, each of which grooves 58, 60 is formed in the interior 62 of the temple decorating member 24.

Referring to FIG. 13, an alternate embodiment for affixation of a temple decorating member 24 to a temple stub 18 is illustrated wherein the temple decorating member 24 is comprised of a substantially U-shaped channel having a bight 64 and a pair of legs 66 and 68. The leg 66 terminates in an integrally formed lip 70 and the leg 68 terminates in an integrally formed lip 72. The legs 66 and 68 are sufficiently flexible to allow the temple stub 18 to pass the lips 70 and 72 when the temple decorating member 24 is urged against the temple stub 18, whereby the temple stub 18 is snappingly, removably, nestingly engaged within a channel 74 defined by the bight 64, the leg 66, and the lip 70, and within a channel 76 defined by the bight 64, the leg 68, and the lip 72.

FIG. 14 illustrates another embodiment of the temple decorating member 24. In FIG. 14, the temple decorating member 24 is formed in a substantially G-shape having a bight 78, a leg 80 which terminates in an integrally formed lip 82, and a leg 84 which has integrally formed at its distal end a tab 86. Affixation of the temple decorating member 24 to the temple stub member 18 is effected by first inserting the upper edge 88 of the temple stub 18 into the channel 90 defined by the bight 78, the leg 84, and the tab 86 and rotatingly urging the lower end 92 of the temple stub 18 toward the temple decorating member 24 thereby causing the leg 80 to flex to allow the temple stub 18 to pass the lip 82 whereby the temple stub 18 is snappingly, nestingly, removably engaged within the channels 90 and 94. The channel 94 is defined by the bight 78, the leg 80, and the lip 82.

Referring to FIG. 12, the engagement structure for affixation of the decorative frame 22 to the eyeglass frame 12 previously described in connection with FIG. 9 is illustrated in greater detail. In FIG. 12, the eyeglass frame 12 has integrally formed therein a plurality of boss members 52. Integrally formed in the eyeglass frame 22 are a like plurality of receptacles 96. The materials chosen for construction of the boss members 52 and the receptacles 96 are sufficiently resilient to effect removable snap-reception of respective bosses 52 within corresponding receptacles 96. The array of bosses 52 on the eyeglass frame 12, and the corresponding array of receptacles 96 on the decorative frame 22 are situated such that the boss members 52 align with their corresponding receptacles 96 when the decorative frame 22 is properly positioned for installation on the eyeglass frame 12. Urging the decorative frame member 22 and the eyeglass frame 12 together effects snap-reception of bosses 52 within corresponding receptacles 96 to provide removable attachment of the decorative frame member 22 to the eyeglass frame 12.

FIG. 11 illustrates another embodiment of the temple decorating member 24 wherein the engagement means comprises a plurality of lands 98 which interact with complimentary lands (not shown in FIG. 11) arrayed on the temple decorating member 24 to effect removable affixation of the decorating member 24 to the temple stub 18.

Referring to FIG. 15, a section view taken along plane 15—15 of FIG. 11 is illustrated to further show the interaction of the temple decorating member 24 and the temple stub 18 in the embodiment described with respect to FIG. 11. In FIG. 15, the temple member 18 has affixed thereto an array of lands 98, and the temple decorating member 24 has arrayed thereon a like plurality of complimentary lands 98a. The lands 98 and the complimentary lands 98a are so arranged that when the temple decorating member 24 is properly positioned with respect to the temple stub 18, the lands 98 are substantially in register with their corresponding complimentary lands 98a, and urging of the temple stub 18 and the temple decorating member 24 together effects a removable, cooperative hook-and-eye affixation of the temple decorating member 24 to the temple stub 18.

Referring to FIG. 16, a perspective view of an alternate embodiment of a decorating frame member 100 affixed to an eyeglass frame 102 is illustrated. In the alternate embodiment illustrated in FIG. 16, temple decorating members 104 are affixed to temple members (not shown in FIG. 16). In the embodiment illustrated in FIG. 16, the decorating frame member 100 may be affixed to the eyeglass frame 102 in any of the manners previously discussed in connection with FIGS. 1–15 hereinabove. The temple decorating members 104 in the embodiment of FIG. 16 have integrally formed therein a light source 106 to which electrical energy is supplied by a battery contained within the temple decorating member 104 (not shown). In such a manner, utilizing the embodiment of the present invention illustrated in FIG. 16, a light source may be affixed to the temple member of the eyeglasses which provides a light source 106 for illumination of work placed before a user wearing the eyeglass frame 102 with the temple decorating members 104 affixed thereto. Of course, the light source 106 could as easily be integrally formed with the decorating frame member 100. In such a configuration, a battery for providing electrical energy to the light source 106 could be affixed to the decorating frame 100 and directly connected to the light source 106. Alternatively, in such a configuration, a battery could be contained within the temple decorating member 104 and connected with the light source 106 by interference fitting connectors or the like.

FIG. 17 illustrates yet another embodiment of the present invention. In FIG. 17, a decorating frame member 108 is affixed to an eyeglass frame 110 by any of the means previously disclosed in connection with FIGS. 1-15 hereinabove. Integrally associated with the decorating frame member 108 is a sinuous light transmission member 112. Preferably, the light transmission member 112 is affixed to the decorating frame member 108 in substantially surrounding relation with the respective lens receiving members 114 when the decorating frame member 108 is affixed to the eyeglass frame 110. Also affixed to a face of the decorating frame member 108 is an electrical battery and light source 116 which is connected by light conducting members 118 and 120 to the light transmission member 112. The light transmission member 112 is oriented to illuminate an area before a user wearing the eyeglass frame 110 with the decorating frame member 108 affixed thereto.

FIG. 18 illustrates an alternate embodiment of the engagement structure which may be employed to affix a temple decorating member 122 to a temple member 124 associated with an eyeglass frame 126. In FIG. 18, the temple decorating member 122 has a substantially J-shaped slot 128 proceeding from the front face 130 of the temple decorating member 122 substantially axially along the temple decorating member 122 to terminate in a bight 132 at a distance from the front face 130 of the temple decorating member 122. The channel 128 is an appropriate width to accommodate a pin 134 affixed to or integrally formed with the temple member 124 so that by slidingly engaging the temple member 124 within the temple decorating member 122 the pin 134 may be received within the channel 128. Further insertion of the temple member 124 within the temple decorating member 122 urges the pin 134 toward the bight 132 and upon reaching the bight 132 a twisting of the temple decorating member 122 will guide the pin 134 to the distal end 136 of the bight 132, thereby providing locking engagement of the temple member 124 within the temple decorating member 122.

FIG. 19 illustrates the embodiment of FIG. 18 in the fully engaged position of the temple member 124 and the temple decorating member 122. Of course, the J-shaped channel 128 need not fully traverse the wall 138 of the temple decorating member 122 but may, instead, only partially traverse the wall 138 of the temple decorating member 122 so that the outward surface of the temple decorating member 122 presents an unbroken surface.

It is to be understood that, while the detailed drawings and specific examples given describe preferred embodiments of the invention, they are for the purpose of illustration only, that the apparatus of the invention is not limited to the precise details and conditions disclosed, and that various changes may be made therein without departing from the spirit of the invention which is defined by the following claims.

I claim:

1. An apparatus for decorating an eyeglass frame, said eyeglass frame having a width and a height, said width being greater than said height; said eyeglass frame further having a frame member defining a pair of eyepiece receiving means for receiving lenses; said eyeglass frame further having an edge and a plurality of protuberances arrayed along said edge; the apparatus comprising a decorative frame member having integral engagement means for removably affixing said decorating frame member to said eyeglass frame, said engagement means comprising at least one upper engagement member and at least one lower engagement member, said at least one upper engagement member comprising a channel depending from a first face of said decorating frame, said channel having a width appropriate for nestingly engaging said eyeglass frame, said channel also having a groove for receiving said plurality of protuberances when said decorating frame is affixed to said eyeglass frame, said at least one lower engagement member depending from said first face and configured for snappingly engaging said eyeglass frame when said eyeglass frame is nestingly engaged in said channel and said decorating frame member is urged against said eyeglass frame, with at least said one upper engagement member and said at least one lower engagement member cooperating to engage said eyeglass frame across said height to removably affix said decorating frame to said eyeglass frame.

2. An apparatus for decorating an eyeglass frame as recited in claim 1 wherein said at least one upper engagement member and said at least one lower engagement member each comprises a ridge depending substantially perpendicularly from a first face of said decorating frame member, each said ridge presenting a raised portion at its unattached end; each of said ridges being appropriately flexible to effect removable snapping engagement between said decorating frame member and said eyeglass frame when said decorating frame member and said eyeglass frame are urged together, said raised portions each being displaced appropriately from said first face to maintain substantially snug contact between said decorating frame member and said eyeglass frame after said snapping engagement is effected.

3. An apparatus for decorating an eyeglass frame as recited in claim 2, wherein said at least one upper engagement member and said at least one lower engagement member collectively substantially surround each of said pair of eyepiece receiving means.

4. An apparatus for decorating an eyeglass frame as recited in claim 1 wherein said eyeglass frame includes complementary attachment means; said at least one upper engagement member, said at least one lower engagement member, and said complementary attachment means comprising cooperating hook-and-eye attachment lands appropriately located to effect removable attachment of said decorating frame member and said eyeglass frame when said decorating frame member and said eyeglass member are urged together.

5. The apparatus for decorating an eyeglass frame as recited in claim 1 wherein said eyeglass frame also comprises a pair of temple members which depend from said eyeglass frame and have a length less than distance from the eyeglass frame to a user's ear.

6. The apparatus for decorating an eyeglass frame according to claim 5 in which a pair of temple decorating members are removably attached to their respective complementary temple members.

7. An apparatus for decorating an eyeglass frame as recited in claim 6 wherein said temple members are secured to said temple decorating members by means of a plurality of lands which interact with corresponding complementary lands.

8. An apparatus for decorating an eyeglass frame according to claim 6 wherein said temple members and said temple decorating members are secured together by removably, cooperative hook-and-eye affixation.

9. An apparatus for decorating an eyeglass frame as recited in claim 6 wherein said temple members and said temple decorating members are secured by means of a J-shaped slot and pin arrangement.

10. An apparatus for decorating an eyeglass frame, said eyeglass frame having a width and a height, said width being greater than said height; said eyeglass frame further having a frame member defining a pair of eyepiece receiving means for receiving lenses; said eyeglass frame further including an edge and a plurality of protuberances arrayed along said edge; the apparatus comprising a decorative frame member having integral engagement means for removably affixing said decorative frame member to said eyeglass frame, said engagement means comprising at least one upper engagement member and at least one lower engagement member, with said lower engagement member comprising a channel depending from a first face of said decorating frame, said channel having a width appropriate for nestingly engaging said eyeglass frame, with said channel further having a groove receiving said plurality of protuberances when said decorating frame is affixed to said eyeglass frame, and said at least one upper engagement member depending from said first face and configured for snappingly engaging said eyeglass frame when said eyeglass frame is nestingly engaged in said channel and said decorating frame member is urged against said eyeglass frame, so that said at least one upper engagement member and said at least one lower engagement member cooperate to engage said eyeglass frame across said height to removably affix said decorating frame to said eyeglass frame.

11. An apparatus for decorating an eyeglass frame member, said eyeglass frame member having a thickness and defining an expanse; the apparatus comprising a decorating member having integral engagement means for removably affixing said decorating member to said eyeglass frame member, said engagement means comprising at least one first engagement member and at least one second engagement member, said at least one first engagement member depending from a first face of said decorating member and cooperating with said decorating member to present a channel of appropriate width to nestingly accommodate said thickness, said at least one second engagement member depending from said first face and presenting an extension, said extension having at least one ridged portion facing said channel and displaced from said first face a distance substantially equal to said thickness, said extension having appropriate flexibility to snappingly receive and affix said eyeglass frame member between said first face and said at least one ridged portion while said eyeglass frame member is also nestingly engaged within said channel, said eyeglass frame member including an edge defined by said thickness and a plurality of protuberances arrayed upon said edge, and said channel including a bight portion intermediate a depending leg and said first face, and a groove in said bight portion for receiving said plurality of protuberances when said decorating member is affixed to said eyeglass frame member, such that at least one first engagement member and said at least one second engagement member cooperate to engage said eyeglass frame member across said expanse to removably affix said decorating member to said eyeglass frame member.

12. An apparatus for decorating frame member as recited in claim 11 wherein said at least one first engagement member and said at least one second engagement member each comprises a ridge depending substantially perpendicularly from a first face of said decorating member, each said ridge presenting a raised portion at its unattached end; each of said ridges being appropriately flexible to effect removable snapping engagement between said decorating member and said eyeglass frame member when said decorating member and said eyeglass frame member are urged together, said raised portions each being displaced appropriately from said first face to maintain substantially snug contact between said decorating member and said eyeglass frame member after said snapping engagement is effected.

13. An apparatus for decorating an eyeglass frame member as recited in claim 12 wherein said at least one first engagement member and said at least one second engagement member collectively substantially surround said eyeglass frame member.

14. An apparatus for decorating an eyeglass frame member as recited in claim 11 wherein said eyeglass frame member includes complementary attachment means; said at least one first engagement member, said at least one second engagement member, and said complementary attachment means comprising cooperating hook-and-eye attachment lands appropriately located to effect removable attachment of said decorating member and said eyeglass frame member when said decorating member and said eyeglass frame member are urged together.

* * * * *